The present invention relates to light collection systems, and, more particularly, but not necessarily exclusively, to condenser optical systems in which modulated light is collected from a plane illuminated by a moving light spot and is directed along an optical path onto a light receiving surface within a relatively small and substantially constant area. Also a plurality of light paths are provided by the operation of wave-length selective reflecting and transmitting devices, the latter being located between optical elements of the condenser optical system along the optical path traversed by light which is not selectively affected by the selective devices.

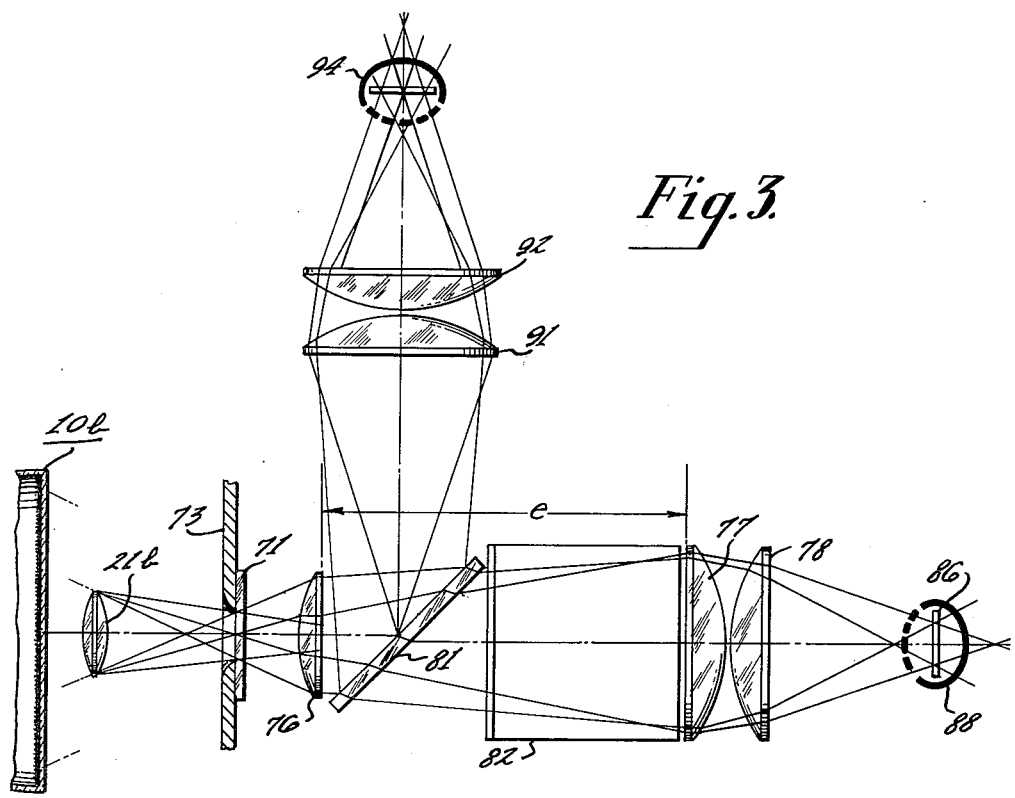
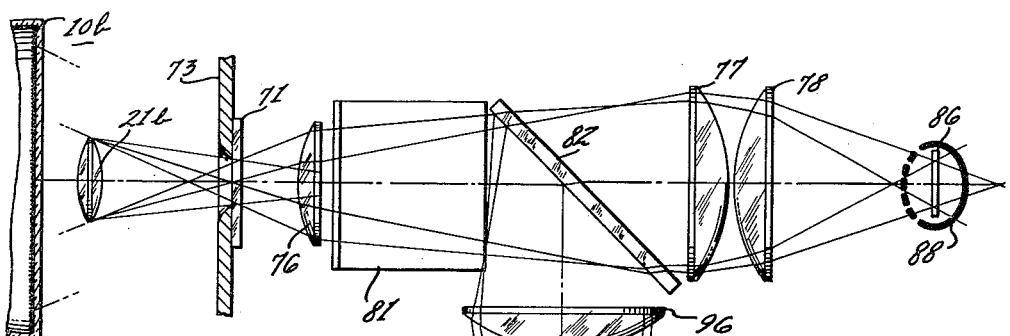
Fig.3.
Fig.4.
INVENTOR.
Donald J. Parker 3,035,179
CONDENSER OPTICAL SYSTEMS FOR FLYING
SPOT SCANNERS
Donald J. Parker, Camden, N.J., assignor to Radio Corporation of America, a corporation of Delaware
Filed May 28, 1953, Ser. No. 358,005
8 Claims. (Cl. 250—226)

In accordance with the present invention, a condenser optical system is provided for providing modulated light from an illuminated image such as a slide, film, or the like, onto a phototube in such a manner that the area of impingement of light on the phototube is confined and is substantially stationary thereby to prevent generation of unwanted signals by the phototube. To confine the light delivered to a phototube in a small area is desirable inasmuch as the cathode surface of the phototube may have variations in sensitivity over its surface.

Also, in accordance with the present invention, the light received from an illuminated source such as a slide, film or the like is to be split so that different portions traverse different optical paths. This is most conveniently accomplished by dichroic beam splitters and, therefore, the light beam at the dichroic beam splitters must be kept reasonably parallel and small in diameter, to keep the diameter of the optical system as small as possible and to obviate the necessity for optical shading or tapering of the dichroic film on the beam splitters.

Moreover, in accordance with the invention, the condenser system of this invention accomplishes the result of accepting light from a high speed objective lens. This is desirable because the available light is or may be split three ways to obtain three optical paths and the light amplitude available in each path is or may be further reduced by selective light filters.

The invention is disclosed herein, illustratively, in connection with a flying spot scanner employing a cathode ray tube producing an illuminated raster provided by a moving light spot, the light being emitted by the phosphor of the tube. The light from the raster is not integrated but is projected from the exit pupil of a large aperture objective lens and in effect a minified image of the objective lens exit pupil is projected onto the light sensitive surface of a phototube. In this fashion the moving spot of light at the face of the kinescope, after modulation by a slide, film or the like, impinges upon a very limited area of the light sensitive surface of the phototube. The condensing system to be disclosed herein not only confines the light impingement area but provides a plurality of optical paths in such a way that the beam splitting devices are located in a region where the light beam originating at the objective lens is parallel and of small diameter.

The principal object of the present invention is to provide a condenser optical system for a flying spot scanner in which light impinging on a light sensitive surface is confined to an area which is small with respect to the area of the original light producing surface.

Another object of the present invention is to provide a condenser optical system which will accept light from a high speed objective lens and in which means are provided for splitting the light into a plurality of optical paths each path ending in a relatively small area of light impingement on a light sensitive surface.

Other objects and advantages of the present invention will, of course, become apparent and immediately suggest themselves to those skilled in the art to which the invention is directed from a reading of the following specification in connection with the accompanying drawing in which:

FIG. 3 is a view similar to FIG. 2 of the condenser optical system of this invention embodying an intermittent type of film projector; and FIG. 4 is a bottom plan view of the schematic form of the apparatus shown in FIG. 3.

Figure 1:
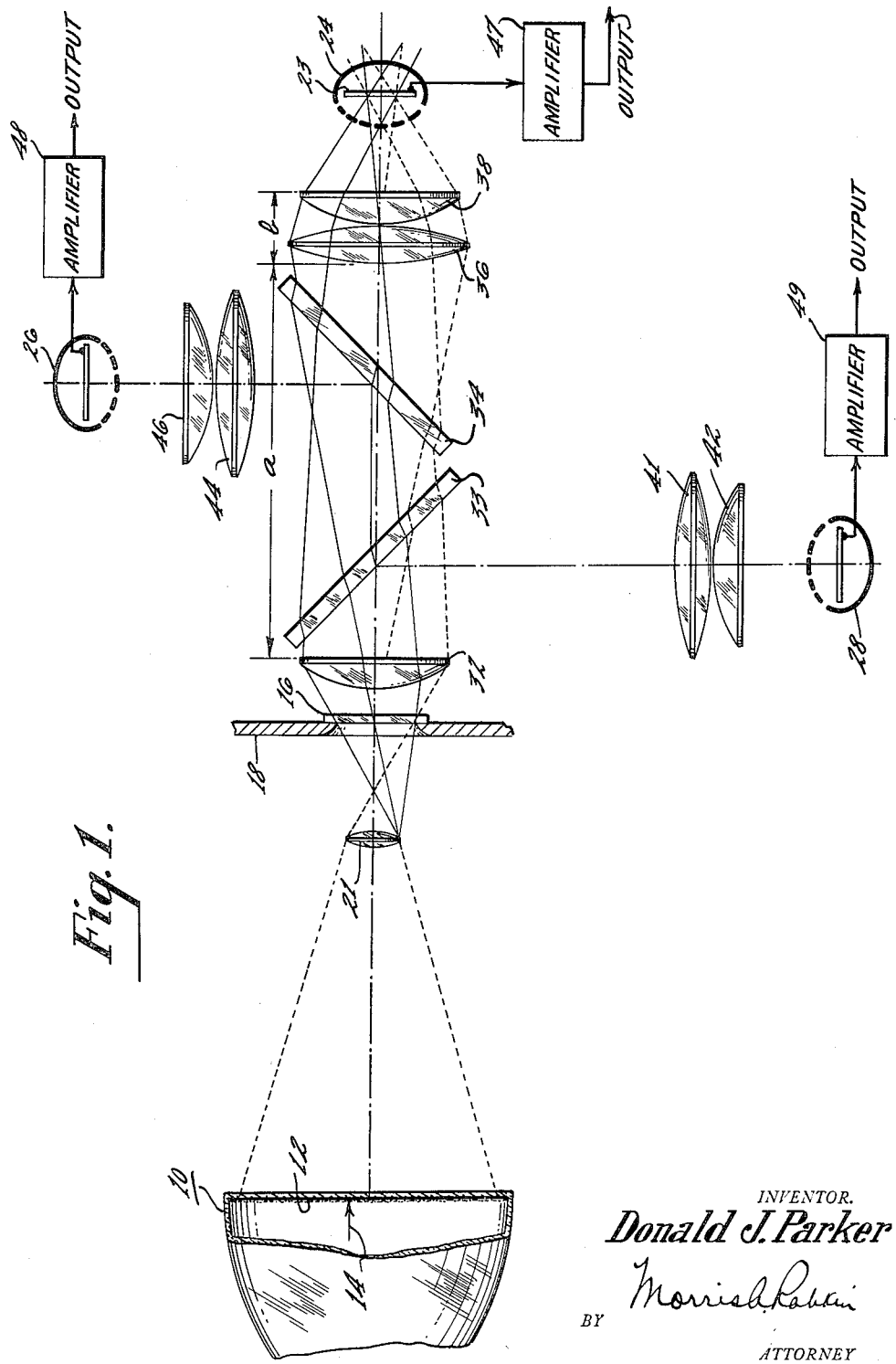
FIG. 1 is a schematic view in elevation of a condenser optical system embodying the invention, the schematic showing including a flying spot scanner tube, a slide or other transparency illuminated by said tube, and a representation of a plurality of phototubes.

Referring to FIG. 1 of the drawing, there is shown a flying spot scanner employing a cathode ray tube 10 having a phosphor or light producing coating 12. A flying spot scanner somewhat resembling that to be described herein is shown on page 863 of the September 1947 issue of the Proceedings of the I.R.E. It will be understood that in a flying spot scanner a focussed substantially constant cathode ray beam 14 is caused to trace a raster periodically on the phosphor 12. Therefore, a moving spot of light is produced which impinges on a transparency or slide 16 placed in known manner with respect to a stop or the like 18. An objective lens 21 images the entire raster upon the slide 16 and as indicated on FIG. 1 there is an appreciable distance between the objective lens 21 and the face of the tube 10. It will be understood that while a simple lens 21 is shown, any combination of lenses may be employed which is suitable optically for the purpose.

One optical path is shown in FIG. 1 of the drawings terminating on the cathode 23 of a phototube 24. The remaining two optical paths terminate in phototubes 26 and 28. The phototubes are of any suitable kind but preferably are of the type having relatively flat cathodes. A type 5819 electron multiplier phototube has, for example, been found suitable. By way of example the optical path terminating in the phototube 24 comprises a condenser lens 32 immediately adjacent the slide 16 or the slide holder, a pair of dichroic beam splitters 33 and 34, and a pair of condenser lenses 36 and 38.

The condenser lens 32 is preferably large enough in diameter to accept the extreme rays from the exit pupil of the objective lens 21 through the corner of the diagonal of the film gate or the aperture in the mask 18 corresponding thereto. The exit pupil of the objective lens 21 is, in effect, the object for the condenser lens 32. The optical characteristics, such as surface curvature, and the thickness of the lens 32 are selected so that the rays from any point in the exit pupil leaving the second surface of the lens 32 are refracted approximately parallel to the optical axis and remain inside a diameter substantially the same diameter as the effective aperture of the lens 32. This condition of parallelism holds for a distance great enough to allow insertion of the previously referred to dichroic beam splitters 33 and 34.

The dichroic beam splitters 33 and 34 do not directly form a part of this invention, but for the sake of completeness of description, reference is made to an article by G. L. Dimmick entitled, "A New Dichroic Reflector and Its Application to Photocell Monitoring Systems" beginning on page 36 of the "Journal of the Society of Motion Picture Engineers" for January 1942. The dichroic beam splitters or reflectors are arranged so that a green representative signal, for example a video signal, is generated by the phototube 24. The phototube 26 generates a blue signal and the phototube 28 generates a red signal.

It will be noted from representative rays traced schematically and solely by way of illustration on FIG. 1 of the drawing that a minified image of the exit pupil of the objective lens 21 is formed at a position shown schematically as being occupied by the cathode 23 of the phototube 24. The same conditions hold for the phototubes 26 and 28. The two condenser lenses 36 and 38 are employed rather than a single lens in this region of the optical path because the optical power required is too great for a single lens without requiring extreme curvature of the surfaces, suffering total internal reflection for some of the rays. The lenses 32, 36 and 38 are preferably designed so that the rays through the intermediate zones are refracted approximately the same amount at each surface. In this connection reference is had to "A One-Ray System for Designing Spherical Condensers," L. T. Sachtleben, December 1942 Journal of the Society of Motion Picture Engineers.

The optical path terminating on the cathode of the phototube 28, resulting from reflection of a portion of the total light by the dichroic beam splitter 33, passes through a lens combination composed of the lenses 41 and 42, which are similar to the lenses 36 and 38, respectively. Lenses 44 and 46 are similar to lenses 36 and 38. Amplifiers 47, 48 and 49 are shown for amplifying the generated signals.

Only by way of example the following data will be given solely for the sake of completeness of description of an illustrative embodiment of the invention. The active face of the kinescope 10 is spaced from the lens 21 or the equivalent lens combination. The dimension indicated by the reference letter $a$ is 6.736 inches. The dimension $b$ is 1.252 inches. The lens 32 is 2.562 inches in diameter. The radius of curvature is 1.969 inches. The thickness is 0.500 inch. The material of the illustrative embodiment is spectacle crown glass.

The lens 36 is 3.125 inches in diameter. The radii of curvature are 4.662 inches. The thickness is .594 inch. This lens is or may be made of spectacle crown glass. The companion lens 38 is 2.812 inches in diameter. The radius is 2 inches. The thickness of this lens is 0.656 inch.

Figure 2:
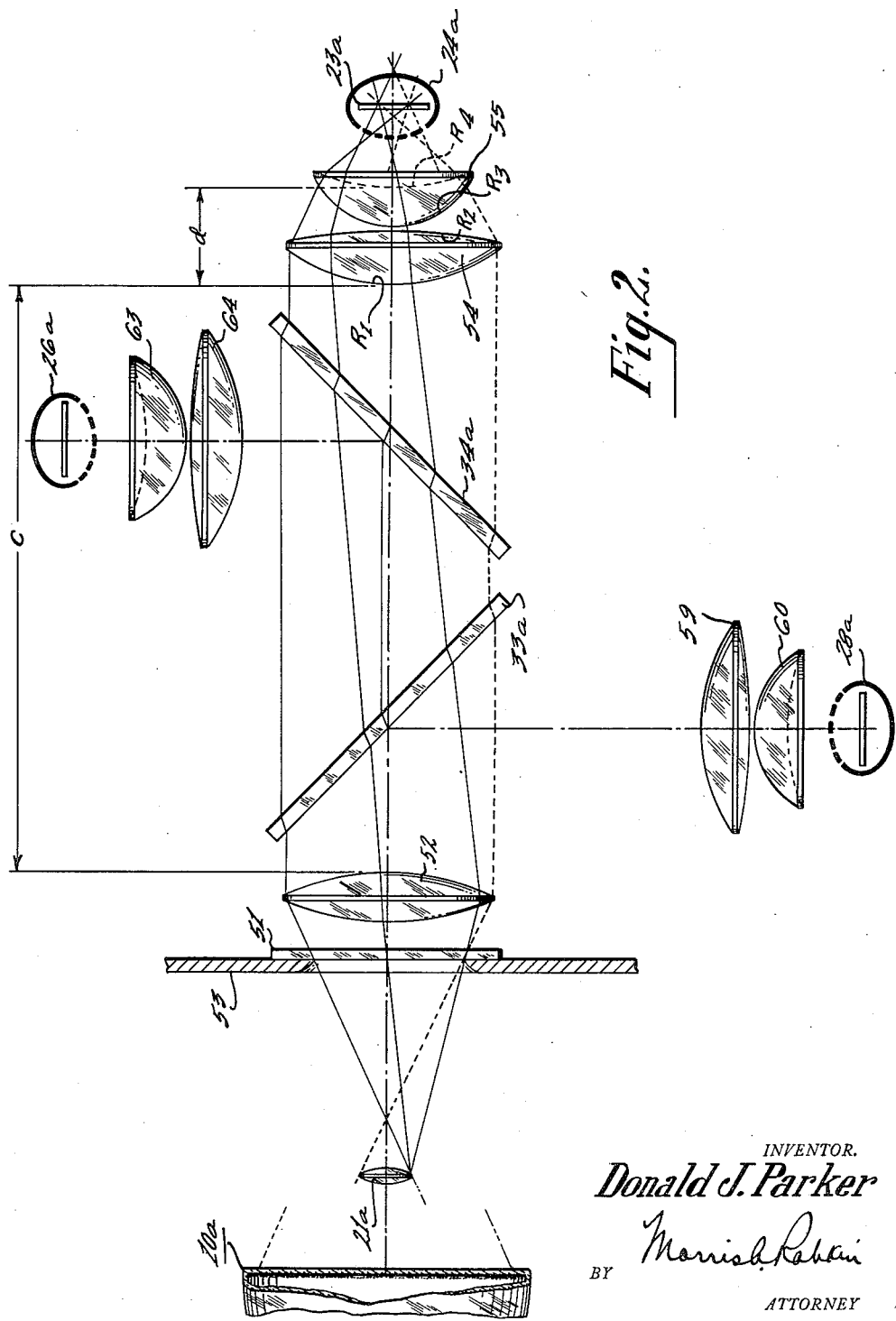
FIG. 2 is a view similar to FIG. 3 illustrating a condenser optical system in accordance with the present invention embodied in a continuous motion film projector.

FIG. 2 of the drawing shows an embodiment of the invention suitable for use with a projector of the type in which motion picture film 51 is scanned while it is in continuous movement. In this type of projector the film gate or aperture 53 is larger inasmuch as the optical system must cover several film frames in most continuous projectors as is well known in the art. Reference characters 10a and 21a represent the flying spot scanner kinescope and the objective lens respectively. The condenser lens 52 refracts the rays in a manner to maintain them substantially parallel as set forth in the description in the lens 32. The dichroic beam splitters 33a and 34a are located in the region following the lens 52. Reference characters 54 and 55 designate two condenser lenses which are similar in function to the condenser lenses 36 and 38. These condenser lenses are of greater power than the lens combination 36 and 38 in view of the larger diameter of the lens 52. The cathode 23a of a phototube 24a receives light from the lens combination 54 and 55 over a small area thereof as set forth previously. A lens combination 59 and 60 corresponds in function to the lens combination 54 and 55 and projects light on the phototube 28a. A lens combination 63 and 64 projects light on the phototube 26a. Phototubes 28a and 26a are similar in function to the phototubes 26 and 28 of FIG. 1 of the drawing. The phototube 26a generates a blue signal and the phototube 28a generates a red signal.

The following data in connection with FIG. 2 of the drawing will be given by way of example and solely for the sake of completeness of description. The face of the kinescope 10a is spaced from the lens 21a as previously set forth. The dimension indicated by the reference letter $c$ is 10.236 inches. The dimension $d$ is 1.689 inches. The lens 52 is 3.750 inches in diameter. The radii of curvature of both faces is 5.056. The thickness of the lens is 0.800. This lens is made of spectacle crown glass. The lens 54 is 3.750 inches in diameter. The radius of curvature $R_1$ is 3.010 inches. The radius of curvature $R_2$ is 12.948 inches. The thickness of this lens is 0.854 inch. The material of this lens is spectacle crown glass. The lens 55 is 2.800 inches in diameter. The radius $R_3$ is 1.530 inches. The radius $R_4$ is 4.079 inches. The thickness at the optical axis is 0.736 inch.

FIGS. 3 and 4 of the drawing disclose a condenser system embodying the invention suitable for use with an intermittent type of film projector in which the film 71 moves intermittently past a film gate 73. Reference character 21b indicates the objective lens which receives light from a kinescope 10b as described previously. The condenser lens system comprises lenses 76, 77 and 78. Interposed between the lenses 76 and 77 are a pair of dichroic beam splitters 81 and 82. The first dichroic beam splitter 81, which is red reflective, is placed in the same relative position as the beam splitters 33 and 33a previously described. The beam splitter 82, which is blue reflective, is rotated through an angle of 90° with respect to the indicated position of the beam splitters 34 and 34a previously described.

The green light passing along the optical path through the lenses 76, 77 and 78 impinges on the cathode 86 of a phototube 88. Lenses 91 and 92 correspond in function to the lenses 77 and 78 and serve to direct the red light upon a phototube 94. Lenses 96 and 97 serve to image the blue light on the cathode of a phototube 99. The arrangement of FIG. 4, like those previously described herein as embodying the present invention, serves to confine the transmitted light to a limited area of the phototube cathode.

By way of example, the following data will be given solely for the sake of completeness of description of a condenser optical system constructed as shown in FIGS. 3 and 4 of the drawings. The dimension $e$ is 3.840 inches. The diameter of the lens 76 is 1.312 inches. The radius of curvature is 1.216 inches. The thickness is 0.250 inch. This lens is made of spectacle crown glass. The lenses 77 and 78 are similar and, therefore, the dimensions given by way of example will apply to each. For example, the lens 77 is 2.125 inches in diameter. The radius of curvature is 1.750 inches. The thickness is 0.438 inch. The lenses 77 and 78 are made of spectacle crown glass.

What is claimed is:

1. A condenser optical system comprising objective lens means, condenser lens means positioned on the optical axis of said objective lens means, said condenser lens means comprising means to direct light rays from said objective lens means substantially parallel to said optical axis, a second condenser lens means, said second condenser lens means serving to project a minified image of the exit pupil of said objective lens means on a light receiving region, and wavelength selective light reflecting and transmitting devices located on the optical axis of said lens means between said objective lens means and said second condenser lens means.

2. A condenser optical system for a flying spot scanner comprising a cathode ray tube for producing an illuminated raster, means to support a bi-dimensional transparency, objective lens means for imaging said produced raster on said transparency, condenser lens means having an effective diameter sufficiently large to accept the extreme light rays from the exit pupil of said objective lens means through the corner of the diagonal of the exposed portion of said transparency, said condenser lens means comprising means to direct light rays from said objective lens means substantially parallel to the optical axis of the lens means, and a second condenser lens means comprising successive lenses, said successive lenses serving to project a minified image of the exit pupil of said objective lens means on a light receiving region.

3. A condenser optical system for a flying spot scanner comprising a cathode ray tube for producing an illuminated raster, means to support a bi-dimensional transparency, objective lens means for imaging said produced raster on said transparency, condenser lens means having an effective diameter sufficiently large to accept the extreme light rays from the exit pupil of said objective lens means through the corner of the diagonal of the exposed portion of said transparency, the light rays leaving said condenser lens means being refracted substantially parallel to the optical axis of the lens means, a second condenser lens means, said second condenser lens means serving to project a minified image of said exit pupil of said first named lens means on a light receiving region, a pair of successive wavelength selective light reflecting and transmitting devices located on the optical axis of said lens means between said objective lens means and said second condenser lens means, each of said devices providing a separate optical path, one of said devices being rotated with respect to the other device whereby said separate optical paths are at right angles.

4. A condenser optical system for a flying spot scanner comprising a cathode ray tube for producing an illuminated raster, a stop having a bi-dimensional opening therein, objective lens means for imaging said produced raster on said opening, condenser lens means having an effective diameter sufficiently large to accept the extreme light rays from the exit pupil of said objective lens means through the opening in said stop, the light rays leaving said condenser lens means being refracted substantially parallel to the optical axis of the lens means, a second condenser lens means, said last named means comprising two aligned lenses, a phototube having a light receiving electrode, said two lenses serving to project a minified image of said exit pupil of said first named lens means on said electrode of said phototube, and wavelength selective light reflecting and transmitting devices located on the optical axis of said lens means between said objective lens means and said second condenser lens means.

5. A condenser optical ssytem for a flying spot scanner comprising a cathode ray tube for producing an illuminated raster, means to support a bi-dimensional transparency, objective lens means for imaging said produced raster on said transparency, condenser lens means having an effective diameter sufficiently large to accept the extreme light rays from the exit pupil of said objective lens means through the corner of the diagonal of the exposed portion of said transparency, said condenser lens means comprising means to direct light rays from said objective lens means substantially parallel to the optical axis of the lens means, a second condenser lens means, said second condenser lens means serving to project a minified image of the objective pupil of said first named lens means on a light receiving region, and wavelength selective light reflecting and transmitting devices located on the optical axis of said lens means between said objective lens means and said second condenser lens means.

6. A condenser optical system for a flying spot scanner comprising a cathode ray tube for producing an illuminated raster, means to support a bi-dimensional transparency, objective lens means for imaging said produced raster on said transparency, condenser lens means having an effective diameter sufficiently large to accept the extreme light rays from the exit pupil of said objective lens means through the corner of the diagonal of the exposed portion of said transparency, said condenser lens means comprising means to direct light rays from said objective lens means substantially parallel to the optical axis of the lens means, a second condenser lens means, said second condenser lens means serving to project a minified image of said exit pupil of said first named lens means on a light receiving region, wavelength selective light reflecting and transmitting devices located on the optical axis of said lens means between said objective lens means and said second condenser lens means, separate optical paths provided by said selective devices, each of said separate paths having condenser lens means corresponding to said second condenser lens means, a phototube for each separate path having a light receiving electrode, and said second condenser lens means for each separate path serving to image the objective pupil of said first named lens means on a light receiving region.

7. A condenser optical system for a flying spot scanner comprising a cathode ray tube for producing an illuminated raster, means to support a bi-dimensional transparency, objective lens means for imaging said produced raster on said transparency, condenser lens means having an effective diameter sufficiently large to accept the extreme light rays from the exit pupil of said objective lens means through the corner of the diagonal of the exposed portion of said transparency, said condenser lens means comprising means to direct light rays from objective lens means substantially parallel to the optical axis of the lens means, a second condenser lens means, said last named means comprising two aligned lenses, a phototube having a light receiving electrode, said two lenses serving to project a minified image of said exit pupil of said first named lens means on said electricode of said phototube, wavelength selective light reflecting and transmitting devices located on the optical axis of said lens means between said objective lens means and said second condenser lens means, separate optical paths provided by said selective devices, each of said separate paths having condenser lens means corresponding to said second condenser lens means, a phototube for each separate path having a light receiving electrode, and said second condenser lens means for each separate path serving to image said exit pupil of said first named lens means on said electrode of the respective phototube.

8. An optical arrangement comprising a flying spot scanner tube light source; a color film slide forming an image area, said source and said image being spaced apart along an optical axis; a projection lens located on said axis between said scanner tube light source and said slide to focus light from said source onto said slide, said lens having an aperture plane therein; a collimating condensing lens located on said axis and spaced from said slide on the side thereof remote from said source to collimate parallel with said axis selected rays of light passing through said slide; a pair of dichroic mirrors fixed at a 45° angle to said axis and being located on said axis on the side of said condensing lens remote from said source, said mirrors being arranged in opposed relation with respect to said axis and operating on light impinging thereon to reflect one primary component of light at right angles to said axis in one direction and a second primary component at right angles to said axis in the opposite direction, and to pass the third primary component of white light along said axis; three photosensitive pickup devices spaced with respect to said mirrors to receive the light therefrom, each of said photosensitive devices receiving only one of said light components; and three secondary condensing lenses, each of said secondary lenses being located between one of said photosensitive devices and said mirrors, each of said lenses coacting with said collimating condensing lens to converge the light passing therethrough onto said photosensitive devices and coacting with said collimating condensing lens to focus an image of said aperture plane on said photosensitive devices.

References Cited in the file of this patent

UNITED STATES PATENTS

| | | |
|---|---|---|
| 1,143,287 | Kohler | June 15, 1915 |
| 2,291,723 | Jensen | Aug. 4, 1942 |
| 2,415,190 | Rajchman | Feb. 4, 1947 |
| 2,415,191 | Rajchman | Feb. 4, 1947 |
| 2,589,930 | Dimmick et al. | Mar. 18, 1952 |
| 2,604,808 | Sachtleben | July 29, 1952 |
| 2,604,813 | Gretener | July 29, 1952 |
| 2,797,256 | Millspaugh | June 25, 1957 |

FOREIGN PATENTS

| | | |
|---|---|---|
| 153,325 | Great Britain | Nov. 3, 1920 |
| 500,728 | Great Britain | Feb. 14, 1939 |